United States Patent
Campbell et al.

(10) Patent No.: US 6,319,449 B1
(45) Date of Patent: Nov. 20, 2001

(54) PROCESS OF MOLDING AN INSERT ON A SUBSTRATE

(75) Inventors: Jeffrey S. Campbell, Binghamton; James T. Holton, Endwell, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/395,624

(22) Filed: Sep. 14, 1999

Related U.S. Application Data

(62) Division of application No. 08/954,215, filed on Oct. 20, 1997, now Pat. No. 5,968,628.

(51) Int. Cl.[7] .......................... B29C 45/14; B29C 70/74; B29C 70/80
(52) U.S. Cl. ...................... 264/267; 264/272.11; 264/276
(58) Field of Search .................................. 264/267, 276, 264/272.15, 272.17, 275, 272.11; 425/116, 544; 428/66.4, 141, 142, 542.8

(56) References Cited

U.S. PATENT DOCUMENTS

| | | |
|---|---|---|
| 3,398,222 * | 8/1968 | Kaufman, Jr. et al. .............. 264/266 |
| 3,608,049 * | 9/1971 | Tavella .................................. 29/235 |
| 4,686,073 | 8/1987 | Koller . |
| 4,867,663 | 9/1989 | Woerner et al. . |
| 5,118,271 | 6/1992 | Baird et al. . |
| 5,306,459 * | 4/1994 | Thomason et al. ............. 264/272.15 |
| 5,543,159 | 8/1996 | Iltgen . |
| 5,597,523 | 1/1997 | Sakai et al. . |
| 5,744,084 * | 4/1998 | Chia et al. ........................... 264/276 |

* cited by examiner

Primary Examiner—Angela Ortiz
(74) Attorney, Agent, or Firm—Ratner & Prestia

(57) ABSTRACT

A molded structure formed in a mold having a space, the molded structure itself constituting a molding body when combined with an upper mold. The molded structure has a substrate which may be a carrier frame for an electrical connector. An insert which may be an elastomer is disposed on the substrate and formed in the space in the mold. A deformable (preferably elastic) molding seal is disposed directly on the substrate and under the elastomer, the molding seal preventing elastomer flash during molding. The molding seal may be a ridge surrounding the space of the mold in which the elastomer is formed. The substrate may also have a datum surface on which the mold locates, with the molding seal disposed in a plane which differs from the plane of the datum surface of the substrate. A process of molding the insert on the substrate is also provided.

7 Claims, 2 Drawing Sheets

PROCESS OF MOLDING AN INSERT ON A SUBSTRATE

This application is a divisional of U.S. patent application Ser. No. 08/954,215, filed on Oct. 20, 1997, now U.S. Pat. No. 5,968,628.

TECHNICAL FIELD

The present invention relates generally to a molding process and, more specifically, both to a molded electrical connector system and to a process for molding such a system substantially without producing undesirable flash.

BACKGROUND OF THE INVENTION

Injection molding is a well-known process for molding plastic parts. One application of injection molding is the formation of electrical connectors. The newly emerging field of electrical connector products requires very tightly toleranced elastomers. As illustrated in FIG. 1, molded elastomers 10 used in electrical connectors are often vulcanized to a carrier frame 12 to enhance the dimensional stability of the elastomer. The elastomer mold apparatus 100 has an upper mold 20, a lower mold 22, and a mold cavity 24 defined between upper mold 20 and lower mold 22 and adapted to receive molded elastomer 10 and carrier frame 12. Upper mold 20 is typically designed to locate on a datum surface 16 of carrier frame 12 to mold critical design elastomer features to the smallest tolerance possible. Datum surface 16 is located on the top of steps 14, which are integrally formed as part of carrier frame 12, along datum line A—A.

Upper mold 20 has partitions 26 which form the space 28 which accepts the material of elastomer 10. The critical height dimension of elastomer 10 is controlled with reference to datum surface 16. Upper mold 20 seats on datum surface 16, without compressing datum surface 16, to define the height of elastomer 10. Partitions 26 must not contact carrier frame 12 when upper mold 20 contacts datum surface 16; otherwise, undesirable deformation of carrier frame 12 might occur. Upper mold 20 cannot simultaneously contact two surfaces while still retaining sufficient control over the height of elastomer 10. Consequently, a clearance 30 exists between partitions 26 and carrier frame 12.

Flashing of the elastomer material may occur, at non-datum surfaces of carrier frame 12 such as the surfaces under partitions 26 of upper mold 20, because partitions 26 do not "shut off" or locate on these non-datum surfaces to seal the flow of elastomer during the injection molding process. Clearance 30 created by the failure to seal the flow of elastomer allows protrusions 40, known as "flash," on the finished article which must then be removed in a separate operation. Flash 40 is difficult to remove from the finished molded part. Typically, flash 40 is removed by a labor-intensive, manual process which adds cost to the part and poses a risk of handling damage.

The problem of flash has been the subject of a number of corrective attempts. Known attempts have been directed toward changes in the design of one or more mold components. Four such attempts are summarized below.

U.S. Pat. No. 5,597,523 issued to Sakai et al. discloses a molding apparatus (10) and method in which a mold cavity gasket is deformed by separately applied pressure to prevent flash formation. The molding apparatus has upper and lower molds (12 and 14, respectively), both made of metal, and a mold cavity (16) defined between the molds and adapted to receive a molding material such as epoxy resin. Due to manufacturing tolerances, a clearance on the order of a few microns tends to remain between the upper and lower molds in the clamped position—particularly when the molds are unheated. If such a clearance exists, the molding material may flow out of the mold cavity and into the clearance. When this occurs, undesirable flash will result.

To avoid flash, an annular recess (20) is defined adjacent to the mold cavity. A gasket (22) is fit in the recess and made of a deformable material such as lead. The gasket may also be made of synthetic resin, plastic, or other electrically insulative organic materials. A passage (24) is defined in the lower mold with one end of the passage communicating with the recess and the other end connected to a pump (26). A pressure medium such as silicon oil (25) fills the passage and exerts pressure on the gasket. This pressure deforms the gasket sufficiently to form a seal around the mold cavity. Although the seal prevents flash, the molding apparatus must be modified to create a recess and a passage in the mold, to accommodate a gasket, and to incorporate a pump and oil.

U.S. Pat. No. 5,543,159 issued to Iltgen discloses a flash-proof reaction-injection-molding (RIM) mold and a method of making the mold. RIM molds, like many molds, have at least two mold segments (14, 16) which, in a closed position, come together to define a mold cavity (8) and into which the reactants (2, 4) are injected. In a mold-open position, the mold permits removal or ejection of the molded article from the mold cavity. The mold segments each have a surface (20, 22) which faces the other mold segment. The surfaces have complementary shapes and come together, in the mold-closed position, along a plane known as a parting line (12) (thus, the parting line is analogous to the datum surface 16 of FIG. 1).

There is usually some degree of mismatch between the mold segment surfaces. This mismatch results in the formation of small gaps between the mating surfaces at the parting line, and particularly at the edge (24) of the parting line which is exposed to the mold cavity. When such gaps occur at the edge of the parting line, the liquid mixture injected into the mold cavity can invade the parting line at its edge and produce protrusions (i.e., flash) on the finished article which must then be removed in a separate operation.

To address the flash problem, Iltgen provides an interlayer film (18') of thermosetting resin between the mating mold surfaces. The resin fills any small gaps between those surfaces to prevent intrusion of the parting line by any liquid reactants injected into the mold cavity. The thermosetting resin adheres firmly to the surface (20) of one of the mold segments. Preferably, the surface of the mold segment to which the resin film adheres is roughened to provide a multiplicity of anchoring sites for the film. Again, although Iltgen addresses the problem of flash, his solution requires modification of the RIM mold to include a roughened mold surface to which a thermosetting resin adheres.

U.S. Pat. No. 4,686,073 issued to Koller discloses a mold modification similar to that of Iltgen. In his device for casting electric components on a terminal carrier plate (4), Koller incorporates a silicon rubber layer (2) which is cast on the surface of a flat, lower mold component (1). The silicon rubber layer is about 1 mm thick and contains recesses (3) which closely correspond to the dimensions of and accommodate the terminal carrier plate. A central mold component (5) is clamped down onto the lower mold component. The central mold component contains chambers (7). A ridge (8) surrounds the port which defines the bottom of each chamber. These chambers match the electrical components which are to be cast. An upper mold component (9) has openings (10) through which the casting resin (11) passes.

When the central mold component is clamped down, the silicon rubber layer is deformed by the ridges to seal the side surfaces (12) of the terminal carrier plate. Consequently, casting resin cannot penetrate the underside (13) and the side surfaces of the terminal carrier plate during casting. Although Koller does not address the problem of flash, he does propose a mold designed to prevent undesirable flow of casting resin. The mold design has a ridge and a cast-on silicon rubber layer.

U.S. Pat. No. 5,118,271 issued Baird et al. is directed to an apparatus for encapsulating a semiconductor device. The mold of the apparatus has a first cavity plate (17) and a second cavity plate (13). A semiconductor lead frame (10) to be encapsulated is placed between the cavity plates. The mold is closed so that the clamping surfaces (23) of the cavity plates clamp directly onto the lead frame. Once the mold is closed, an encapsulating material is introduced into the mold to encapsulate the lead frame. Elastic seals (19, 21) surround the outer surface of each cavity plate but do not cover either the clamping surfaces or the inner surfaces of the cavity plates. After the mold is closed, the elastic seals are pressurized and deform to compensate for any dimensional variations of the mold cavity plates or lead frame and completely seal the space between leads. Therefore, the elastic seals provide a supplementary seal to the clamping surfaces of the cavity plates and a primary seal in the space between leads of the encapsulated lead frame. These seals prevent encapsulating material from escaping.

Like the Koller device, the apparatus of Baird et al. does not address the problem of flash. Baird et al. propose a mold designed to prevent undesirable flow of encapsulating material. The mold design has elastic seals surrounding the outside surface of the mating mold cavity plates.

To overcome the shortcomings of prior attempts to address the problem of flash formation during the process of molding an elastomer to a substrate such as an electrical connector, a new, deformable, elastomer molding seal for use in an electrical connector system is provided. An object of the present invention is to provide a molding seal. Another object is to mold a plastic or metal substrate without producing undesirable flash, thereby eliminating the need for a costly process step which removes elastomer flash. A related object is to eliminate a flash removal step while avoiding modifications to the mold. Another related object is to reduce the cost of manufacturing a molded part.

It is still another object of the present invention to improve the quality of the completed, molded part by eliminating the risk of handling damage which arises when the part is exposed to the process step of flash removal. Yet another object of this invention is to extend the life of the mold used to manufacture the molded part. An additional object is to achieve these advantages while still allowing the mold to accurately register the height of the molded elastomer to any surface of the substrate desired by proper mold design. Finally, an object of the present invention is to meet the need for very tightly toleranced elastomers demanded by the newly emerging field of electrical connector products.

SUMMARY OF THE INVENTION

To achieve these and other objects, and in view of its purposes, the present invention provides a molded structure formed in a mold having a space, the molded structure itself constituting a molding body when combined with an upper mold. The molded structure has a substrate which may be a carrier frame for an electrical connector. An insert subject to the formation of flash (such as an elastomer) is disposed on the substrate and formed in the space in the mold. A deformable molding seal is disposed directly on the substrate and under the insert, the molding seal preventing flash during molding. The molding seal may be a ridge surrounding the space of the mold in which the insert is formed. The substrate may also have a datum surface on which the mold locates, with the molding seal disposed in a plane which differs from the plane of the datum surface of the substrate.

According to another aspect of the present invention, a process of molding a flashable insert on a substrate is provided. The process includes the following steps. First, a mold is provided having an upper mold with a space, a lower mold, and a cavity disposed between the upper mold and the lower mold. A substrate, having a datum surface and a deformable molding seal, is positioned in the mold cavity. Either before or after the previous step, a flashable material is delivered to the space of the upper mold. Finally, the mold is activated. This final step causes the upper mold to locate on the datum surface of the substrate and forms an insert on the substrate from the flashable material. The molding seal prevents formation of flash. Therefore, the process of the present invention avoids a step of flash removal.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
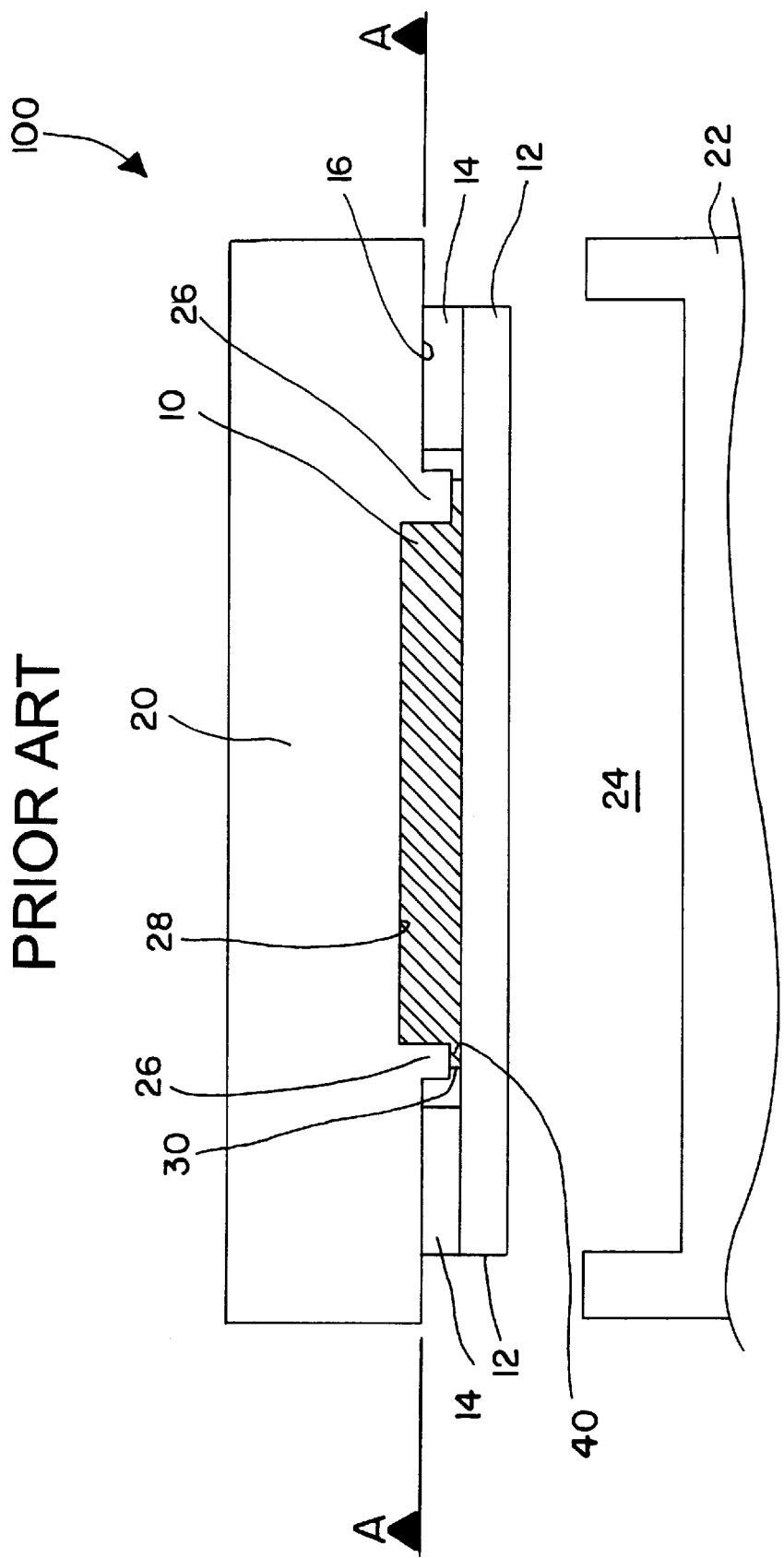
FIG. 1 is a cross-sectional view of the mold engaging the elastomer and carrier frame without the sealing ridge of the present invention.
Figure 2:
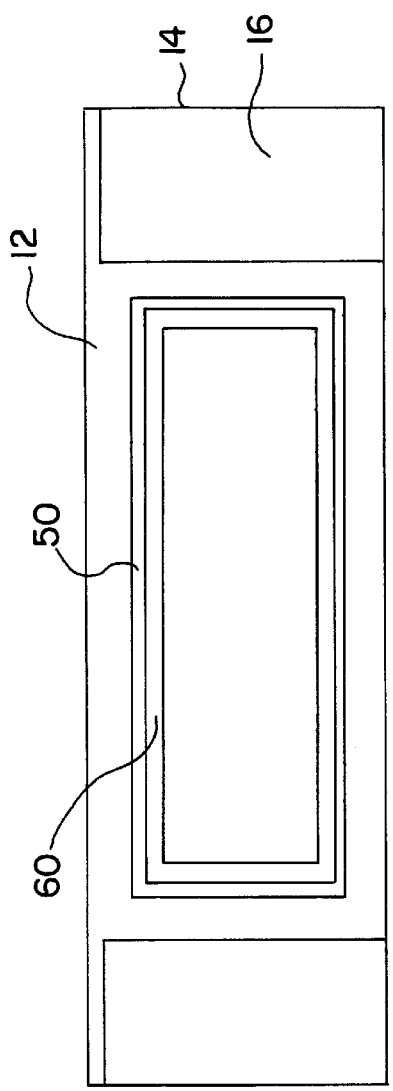
FIG. 2 is a top view of the carrier frame without the mold present.

Referring now to the drawing, wherein like reference numerals refer to like elements throughout, FIG. 2 is a top view of the substrate or carrier frame 12 without the mold present. The goal of the molding process is to attach an insert, which is subject to the formation of flash (i.e., the insert is a "flashable" material such as an elastomer, plastic, or aluminum), to the substrate. The flashable insert in the particular example illustrated is elastomer 10. Shown in FIG. 2 is the groove 32 in which elastomer 10 will be disposed in carrier frame 12. Carrier frame 12 may be made of plastic, although other suitable materials can be used, and is typically rectangular with a length of between 38 and 76 mm (1.5 and 3 inches). Again, however, other shapes and dimensions can be provided for carrier frame 12.

Figure 3:
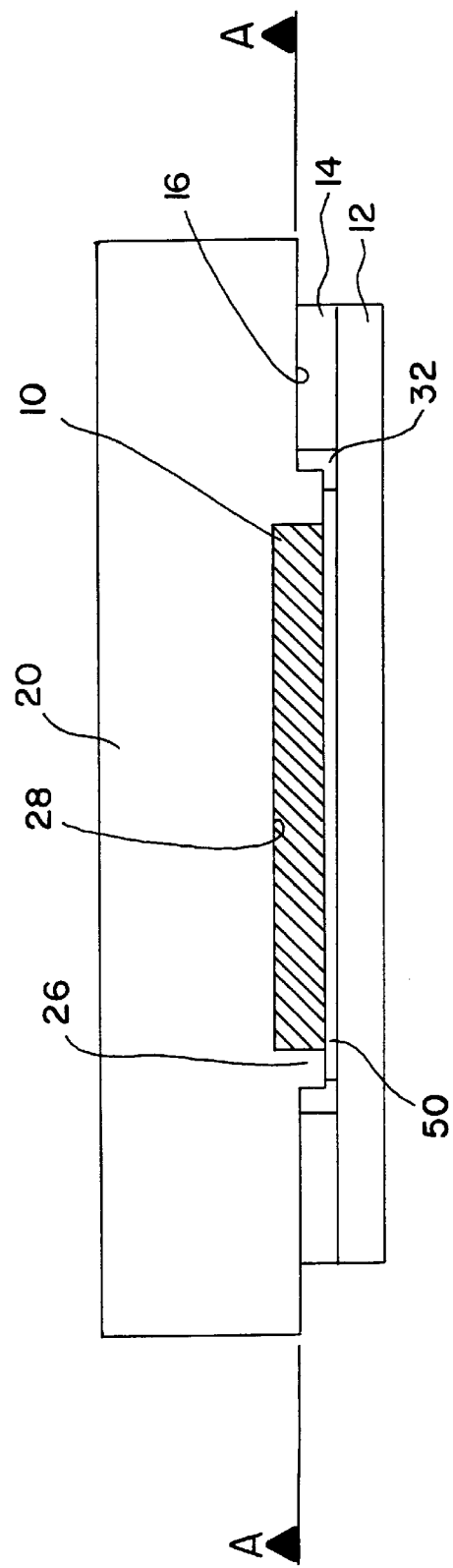
FIG. 3 is a cross-sectional view of the mold engaging the elastomer and carrier frame with the sealing ridge according to the present invention.

FIG. 3 is a cross-sectional view of upper mold 20 engaging elastomer 10 and carrier frame 12. Both FIGS. 2 and 3 show that a deformable sealing ridge 50 is provided directly on carrier frame 12. A spacer 60 (see FIG. 2) may be provided between ridge 50 and elastomer 10 to prevent distortion of the critical dimensions of elastomer 10. Ridge 50 may be integral with carrier frame 12 (i.e., ridge 50 and carrier frame 12 form a single, integrated, one-piece, monolithic component); alternatively, ridge 50 may be attached as a separate component to carrier frame 12 and such attachment may occur during the same molding process by which elastomer 10 is molded to carrier frame 12.

Ridge 50 is a narrow, raised rib of material (preferably elastic, plastic, and hollow) which surrounds space 28 in which elastomer 10 is vulcanized and forms a molding seal. Carrier frame 12 itself is used as a molding insert in the molding process by which elastomer 10 is vulcanized to carrier frame 12. As upper mold 20 "shuts off" or locates on datum surface 16 of steps 14 of carrier frame 12, ridge 50 is crushed or compressed, then plastically deformed slightly, as the mold closes. More particularly, partition 26 of upper mold 20 engages ridge 50. The compression of ridge 50 provides a tight seal which prevents flashing of the material forming elastomer 10 beyond ridge 50. The elastomer material is allowed to flow, from space 28 of vulcanization, only to ridge 50.

Space 28 in which elastomer 10 is formed may be a rectangular opening about 6.4 mm (0.25 inches) wide and 25 to 50 mm (1 to 3 inches) long. Elastomer 10 is typically 0.9 to 1.8 mm (35 to 70 mils) high. Because the height of elastomer 10 is an important dimension, upper mold 20 must accurately locate on datum surface 16 of carrier frame 12 to control carefully the height of molded elastomer 10. Ridge 50 is disposed in a plane which differs from the plane in which datum surface 16 is located. As illustrated, the plane of ridge 50 is below the plane of datum surface 16. Upper mold 20 seats on datum surface 16 without compressing datum surface 16 or deforming carrier frame 12 away from datum surface 16.

Ridge 50 forms a part of carrier frame 12. Thus, a part of one component to be molded (namely, carrier frame 12) forms the seal which prevents flashing of another molded component (namely, the material of elastomer 10). This aspect of the design of the present invention avoids the need to modify mold elements to prevent flashing.

Ridge 50 is between about 0.08 to 0.13 mm (3 to 5 mils) high and wide. Thus, ridge 50 preferably has a height which is less than one-tenth the height of elastomer 10. The dimensions of ridge 50 are sufficiently small that ridge 50 has negligible effect on the structure and function of the completed, molded part. That part includes carrier frame 12, ridge 50, and elastomer 10—all molded together. Specifically, elastomer 10 is fully adhered (vulcanized) to carrier frame 12 within space 28 encompassed by ridge 50.

The completed, molded part of the present invention is formed at a significant cost savings: the elimination of elastomer flash avoids costly flash removal. Moreover, the quality of the completed part is improved by eliminating the risk of handling damage which arises when the part is exposed to the process step of flash removal. These advantages are achieved while still allowing the mold to accurately register the height of the molded elastomer to any surface of the carrier frame desired by proper mold design. Thus, the present invention meets the need for very tightly toleranced elastomers demanded by the newly emerging field of electrical connector products. The present invention can also be incorporated in many other product applications—whether the applications be futuristic, emerging, existing, or mature—that require flash-free inserts with very close tolerance control.

Upper mold 20 and lower mold 22 are made of a rigid material such as tool steel and are machined to very tight tolerances. It is extremely difficult to maintain machining tolerances at a level that will avoid mold flash from escaping through small spaces in the machine surfaces. As the mold wears, the spaces which permit flash tend to become larger. The solution offered by the present invention, which inhibits flash formation even as the spaces expand, functions to extend the life of the mold.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A process of molding an insert on a substrate comprising the steps of:
    (a) providing a mold having an upper mold with a space, a lower mold, and a cavity disposed between the upper mold and the lower mold;
    (b) positioning a substrate, having a datum surface on which the upper mold locates;
    (c) positioning an elastic, deformable molding seal in the mold cavity so as to be positioned to outwardly surround an outer radial edge of an insert to be formed in the mold;
    (d) delivering an insert material to the space of the upper mold; and
    (e) activating the mold, causing the upper mold to locate on the datum surface of the substrate and forming an insert on the substrate from the insert material, the molding seal preventing formation of insert flash.

2. The process of claim 1 avoiding a step of insert flash removal.

3. The process of claim 1 wherein the step (e) of activating the mold compresses, then plastically deforms slightly, the molding seal, thereby providing a tight seal around the space of the mold.

4. The process of claim 1 wherein the substrate is a carrier frame and the molding seal is a ridge.

5. The process of claim 4 wherein the ridge is integral with the carrier frame and both the ridge and the carrier frame are plastic.

6. The process of claim 1 wherein the molding seal is hollow.

7. The process of claim 1 further comprising the step of positioning a spacer between the molding seal and the insert material.

\* \* \* \* \*